United States Patent Office 3,524,222
Patented Aug. 18, 1970

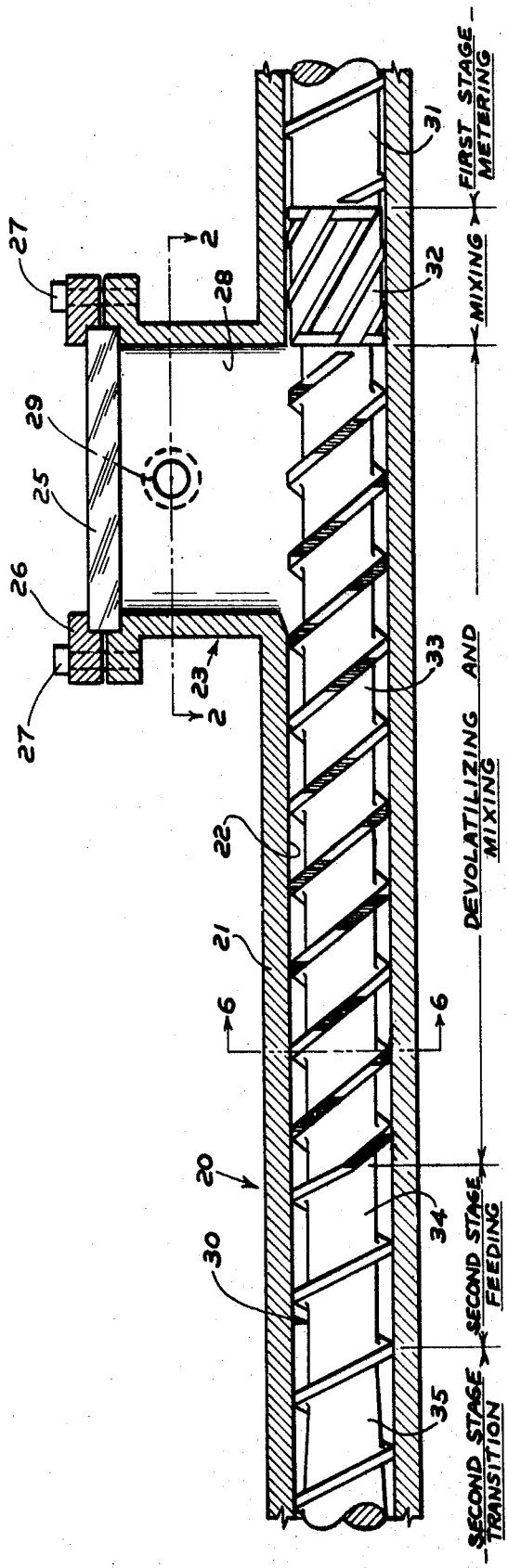
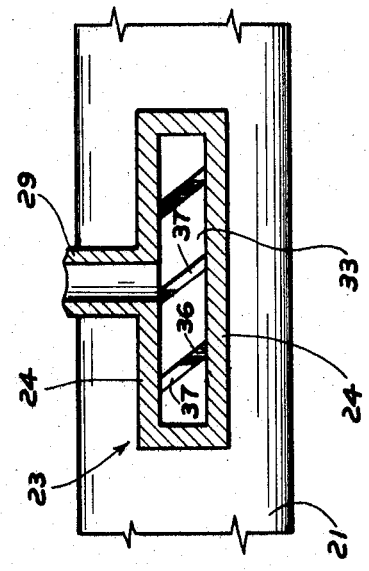
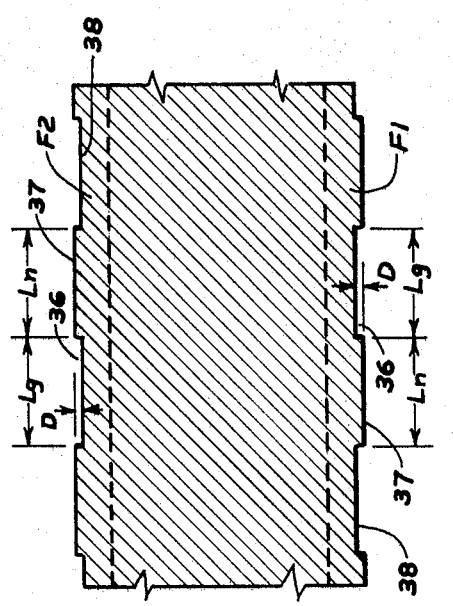
INVENTORS
ROBERT B. GREGORY
LOUIS F. STREET
BY DAVID A. VERNER
ATTORNEY

3,524,222
EXTRUDER SCREW DEVOLATILIZING AND MIXING SECTION
Robert B. Gregory, Flemington, Louis F. Street, Hampton, and David A. Verner, South Orange, N.J., assignors to Egan Machinery Company, Somerville, N.J., a corporation of New Jersey
Filed May 13, 1968, Ser. No. 728,495
Int. Cl. B29f 3/02
U.S. Cl. 18—12
18 Claims

ABSTRACT OF THE DISCLOSURE

A plastics extrusion machine including a barrel having a cylindrical bore, a rotary screw unit within the bore for advancing plastic material therealong and a venting unit communicating with a selected portion of the bore and adapted to withdraw volatiles evolved from the plastic material. The screw unit includes a devolatilizing and mixing screw section that is positioned in said selected portion of the bore and that is provided with a plurality of helical flights of the same hand and lead. Each flight is formed with a plurality of normal flight portions and a plurality of grooves, each groove extending across its flight. The grooves and the normal flight portions are arranged alternately along each flight. The length of each groove, as measured in a direction parallel to the axis of the screw unit, is within the range of from 10% to 100% of the outside diameter of the screw section times the number of flights minus one. The length of each normal flight portion, measured in the same manner as that of each groove, is equal to the length of each groove divided by the number of flights minus one. The depth of each groove is within the range of from 0.3% to 10.0% of the outside diameter of the screw section, as measured over normal flight portions. Each groove may have a constant depth or a varying depth. Also, each groove may consist of a plurality of successive groove portions, the depths of such portions increasing successively and by the same increment in the direction of the upstream end of the screw unit.

BACKGROUND OF THE INVENTION

This invention relates to extruder screws of the general type used in the extrusion of thermoplastics and, more particularly, to a novel screw section that may be advantageously employed as part of such an extruder screw to effect adequate devolatilization and improved mixing of a plastic material during an extrusion procedure.

In many plastic extrusion procedures, it is important and necessary that volatile components of the plastic material be evolved therefrom and removed during movement of the material through an extruder barrel in order to obtain a satisfactory end product. This may be accomplished by providing a section in the extruder barrel in which the material in molten condition is subjected to controlled pressure or vacuum to cause volatile components to be evolved or boiled off, the evolved volatiles being withdrawn from the extruder through a vent means which communicates with the indicated barrel section. In order to attain the desired degree of devolatilization in minimum amounts of time and space, it is essential and desirable that a maximum amount of surface area of the material be exposed to the controlled pressure or vacuum. It is also desirable that the material, in the course of devolatilization, be simultaneously subjected to thorough mixing and remixing.

As will be evident to persons trained in the art from the detailed description appearing further along herein and the accompanying drawings, the screw section of this invention simultaneously effects economical necessary devolatilization and improved mixing and remixing of plastic material during an extrusion procedure.

SUMMARY OF THE INVENTION

The devolatilizing and mixing screw section of this invention represents the improvement in an otherwise conventional plastics extrusion machine which includes a barrel having a cylindrical bore, a rotary screw unit within the bore for advancing a plastic material therealong and a venting unit communicating with a selected portion of the bore and adapted to effect withdrawal of volatiles evolved from the plastic material. The devolatilizing and mixing screw section is positioned within said selected portion of the bore and is coaxial and rotatable with the screw unit. The screw section is provided with a plurality of helical flights of the same hand and lead. Each flight is formed with a plurality of normal flight portions and a plurality of grooves, each groove extending across its flight and inwardly from the peripheral surface of normal flight portions. The grooves and normal flight portions are arranged alternately. Each groove has a length, as measured in a direction parallel to the axis of the screw section, within the range of from 10% to 100% of the outside diameter of the screw section times the number of flights minus one and a depth within the range of 0.3% to 10.0% of the outside diameter of the screw section, as measured over the normal flight portions. The length of each normal flight portion, as measured in a direction parallel to the axis of the screw section, is substantially equal to the length of each groove divided by the number of flights minus one.

As is described in the detailed description that follows and shown in the drawings, each groove may have a constant depth or a varying depth. Moreover, each groove may consist of a plurality of successive groove portions, the depths of such portions increasing successively and by the same increment in the direction of the upstream end of the screw unit. The number of groove portions per groove and the length of each such portion as compared to the length of each normal flight portion are interdependent and related to the number of flights, as will be explained further along herein.

It is the primary object of this invention to effect simultaneous adequate devolatization and improved mixing of a plastic material in the course of an extrusion procedure.

Another object of this invention is to provide an extruder screw unit with a devolatilizing section that is adapted, in operation, to cause a maximum surface area of a plastic material to be exposed to controlled pressure or vacuum.

A further object of this invention is to provide a screw unit with a section that is adapted, in operation, to effect requisite devolatilization of a plastic material and simultaneously subject the material to thorough mixing and remixing under conditions of low shear.

This invention has for a still further object the provision of an extruder screw devolatilizing and mixing section of the character indicated that is simple in design; that is sturdy and durable in construction; that is reasonable in manufacturing and maintenance costs; that is economical in operation, and that is capable of performing its intended functions in a dependable and efficient manner.

The enumerated objects and additional objects together with the advantages of the invention, will be readily apparent to persons trained in the art from the following detailed description and the accompanying drawings which respectively describe and illustrate three embodiments of the invention.

3,524,222

BRIEF DESCRIPTION OF THE DRAWINGS

In the drawings, wherein like reference characters denote corresponding parts throughout the several views:

FIG. 1 is a central longitudinal section through a portion of a plastics extruder barrel having an extruder screw which includes a devolatilizing and mixing section according to this invention;

FIG. 2 is a view taken along line 2—2 of FIG. 1;

FIG. 5 is an enlarged view of the screw taken along line 5—5 of FIG. 3;

DESCRIPTION OF THE PREFERRED EMBODIMENTS

Figure 3:
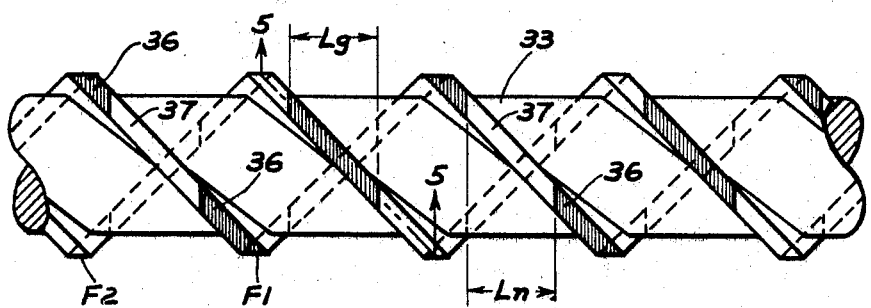
FIG. 3 is an enlarged side elevation view of a portion of the devolatilizing and mixing section of the screw shown in FIG. 1.

Reference is first had to FIGS. 1 and 2 of the drawings which illustrate a portion 20 of a 2-stage plastics extrusion machine including a barrel 21 having a central longitudinal bore 22. The barrel is equipped on its top with a tubular venting unit 23 which is rectangular in transverse cross section, as shown in FIG. 2, and which includes a pair of spaced, parallel, vertical side walls 24. The venting unit is closed at its upper end by a sight glass piece 25 that permits of ready visual inspection of the venting operation during operation and that is removably secured thereto by a ring 26 and screws 27. The venting unit defines a venting chamber 28 which communicates with barrel bore 22. A conduit 29 is connected to a side wall 24 of unit 23 and establishes communication between the upper portion of chamber 28 and a source of vacuum or other means for controlling the pressure within the chamber (not shown).

Positioned within barrel 21 and rotatable by conventional drive means (not shown) is an extruder screw 30 which, by way of example, consists of the following sections, reading from right to left in FIG. 1: a first stage feeding section (not shown), a first stage transition section (not shown), a first stage metering section 31, a mixing section 32, a devolatilizing and mixing section 33, a second stage feeding section 34, a second stage transition section 35 and a second stage metering section (not shown). It should be borne in mind that the extruder screw may comprise various suitable arrangements of known screw sections in conjunction with devolatilizing and mixing section 33 of this invention.

Figure 4:
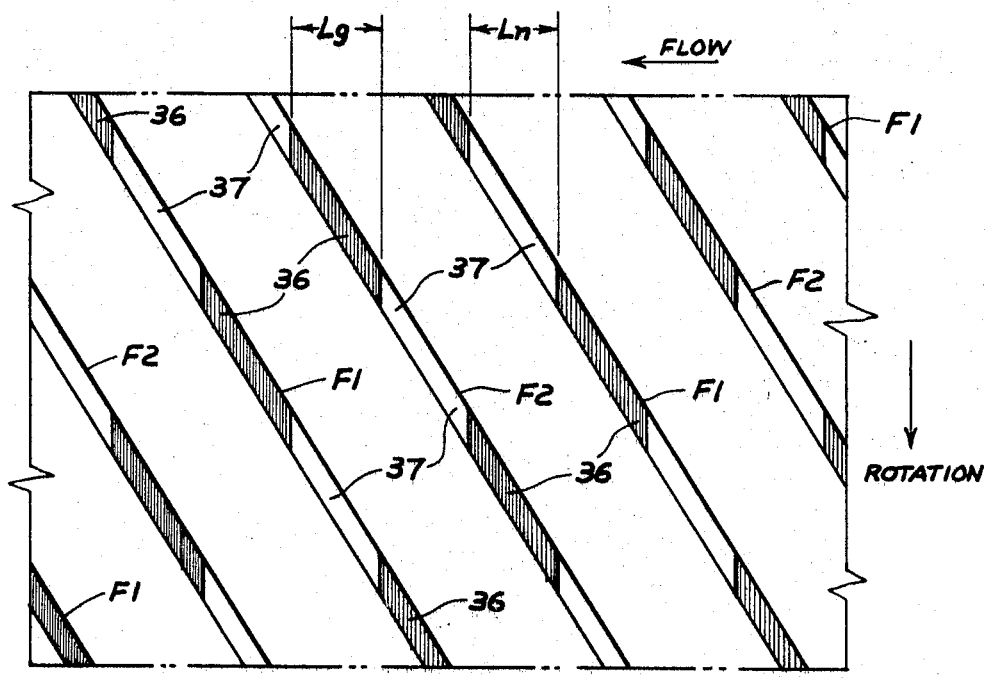
FIG. 4 is a development of the screw configuration shown in FIG. 3.

As is best shown in FIGS. 3 and 4, devolatilizing and mixing section 33 is provided with a double flight consisting of helical flights F1 and F2 which are preferably identical and of the same hand and lead. Formed in and along each flight are equi-spaced shallow grooves or depressions 36 which appear as shaded areas in FIGS. 1 through 4. The normal portions of each flight are identified by numeral 37. It will be noted from an examination of FIG. 4 that the grooves 36 and the normal portions 37 of each flight are arranged alternately. Each groove 36 extends across the entire width of its flight and has a depth D measured from the outside diameter of normal flight portion 37 (FIG. 5). The length Lg of each groove 36, as measured in a direction parallel to the axis of the screw, is in this embodiment of the invention preferably equal to the length Ln of each normal flight portion 37 measured in the same manner. Each groove 36 of each flight is directly opposite a normal portion 37 of the other flight, as shown in FIG. 5.

The peripheral portions 38 of the flights which define the bottoms of the grooves are preferably portions of the surface of a right circular cylinder as would be obtained in a machining procedure wherein a workpiece is rotated while milling grooves therein. Peripheral portions 38 may, if desired, be milled flat or otherwise without appreciable adverse effect on the efficiency of the screw. Also, it may be advantageous, in some instances, to omit grooves 36 in the part of screw section 33 which is located directly beneath vent chamber 28.

For the purpose of outlining the operation of the above-described embodiment of the invention, it is assumed that a plastic material, such as a polymer containing a volatile component, is introduced into the feed end (not shown) of barrel 21 and is successively moved through the indicated first stage feed, transition and metering sections and mixing section 32 by rotation of screw 30. In the course of such movement, the material is melted and mixed to a uniform consistency in a manner well known to the art. The melted material then enters and is advanced, by rotation of the screw, through devolatilizing screw section 33 wherein it is subjected to further mixing and its volatile component is effectively evolved and withdrawn by way of venting chamber 28 and conduit 29, as will be explained in detail further along herein. The devolatilized material is forwarded by the screw through the second stage screw sections 34 and 35 and is eventually discharged from the barrel.

Figure 6:
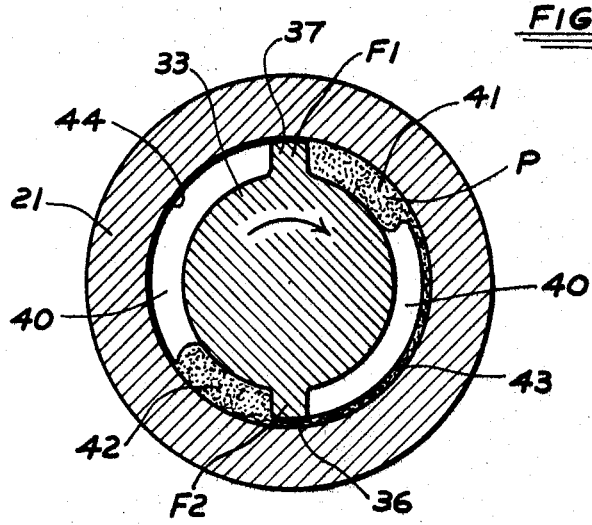
FIG. 6 is a view in enlargement taken along line 6—6 of FIG. 1.

Reference is now had to FIG. 6 for an understanding of the action of screw section 33 on the melted plastic material as it is advanced thereby from section 32 to section 34. The plastic material is denoted by the letter P and the spaces between flights F1 and F2 are identified by numeral 40 in this view. Assuming that the screw is rotating in a clockwise direction, as indicated by the arrow, the material P attains, at a selected instant during such rotation, the illustrated annular ring configuration consisting of a portion 41 to the right of flight F1, a portion 42 to the left of flight F2, a portion 43 between portions 41 and 42 and to the right of the screw axis and a portion 44 also between portions 41 and 42 but to the left of the screw axis. Portions 41 and 42 fill parts of spaces 40. The thickness of portion 43 is determined by the depth D of grooves 36 and the clearance between the flights and barrel bore 22. Portion 44 is very thin and corresponds to the clearance between the flights and the bore. Substantially all of the plastic material will remain on the inner surface of the barrel for somewhat less than a one-half revolution of the screw, at which time it will be scraped off by the normal portion 37 of flight F1 onto the next approaching flight or by material collected and backed by the next approaching flight, corresponding to portion 41. Concomitantly, the material of the annular ring is mived with mtterial being forwarded by the approaching flight thereby adding to it and providing a continually changing supply of the material which is deposited by flight F2 in another annular ring. Thus, as the material is being moved through the venting zone, there is a continuous formation of annular rings of the material on the inner surface of the barrel, a continuous scraping off and blending of the material of the rings and a continuous redepositing of the material in new annular rings.

Because of the necessity of providing adequate clearance, i.e. a clearance within the range of from 0.005″ to 0.030″ depending on the composition of the plastic material, between normal flight portions 37 and the inside of the barrel to permit free rotation of the screw in the barrel, material portion 44, as stated above, has the form of a very thin film. This film is exposed to the vacuum in corresponding space 40 and is mixed with material of portion 42 as the screw rotates.

The design of screw section 33 is such that its material-forwarding capacity is substantially greater than that of the upstream sections of the screw. As a result, the spaces 40 between the flights are only partially filled with the plastic material during operation. The deposited ring portion 43 is, therefore, exposed to the vacuum that prevails throughout the entire length of screw section 33 and to a point downstream of this section where the material is packed so tightly between the flights of the second stage sections as to block and prevent passage of any remaining volatiles back to venting chamber 28. It will be apparent from an examination of FIGS. 1, 2 and 6 that the illustrated construction creates a large material surface area, which is exposed to vacuum, and effects numerous remixings of the material and exposures of new material surfaces to the vacuum.

For best practical results, depth D of grooves 36 should be within the range of from 0.3% to 10.0% of the outside diameter of the screw, as measured over the normal flight portions 37. This range has been ascertained from consideration of a number of factors including the "devolatilizing diffusivity" characteristic of particular plastic materials. In order to effect maximum devolatilization, it would be necessary to expose the maximum surface area of the material to vacuum. This, in theory, requires formation of the material into a film having infinite surface area and infintesimal thickness. This is obviously not feasible in a plastics extrusion procedure. As a practical matter, it is desirable to spread the material into a film having a maximum exposed surface area and a thickness that permits satisfactory devolatilization during the time that it is exposed to the vacuum. It is therefore, evident that the principal factor which determines such film thickness is the devolatilizing diffusivity characteristic of the plastic material to be processed. In the case of materials having relatively high devolatilizing diffusivity, volatiles may be removed from a substantial distance below the exposed surface thereof, when exposed to vacuum, in a short time. materials having low devolatilizing diffusivity, on the other hand, tend to retain their volatiles at any substantial distance below the exposed surface unless the surface is subjected to vacuum for a prohibitively long time. Hence, the thickness of the deposited material portion 43 (FIG. 6), which is determined by depth D of grooves 36, is dependent on the devolatilizing diffusivity of the particular material to be processed by the machine. The above-stated range of depth D is best suited from an economically practicable viewpoint as regards plastic materials that are commonly subjected to extrusion procedures.

The length $Lg$ of each groove 36 should be within the maximum range of from 10% to 100%, and preferably within the range of from 15% to 50%, of the outside diameter of the screw, as measured over the normal flight portions 37. Each time material deposited by flight F2 (FIG. 6) is scraped off by flight F1, it is thoroughly mixed and the part which was closest to the barrel wall and which, as a consequence, was not as completely devolatilized as the surface material, will be distributed fairly uniformly. Upon being deposited in succeeding annular rings, the material is repeatedly processed whereby all of the material will be effectively and uniformly devolatilized.

In a typical example of a devolatilizing and mixing screw section 33 for use in a plastics extrusion machine utilizing a barrel 21 having a 3.500″ bore diameter, pertinent dimensions of the screw section may comprise an outside diameter of 3.493″ measured over normal flight portions 37, a lead of 6.350″, a root diameter of 2.493″, a depth D of 0.20″, a groove length $Lg$ of 1.000″ and a like normal flight portion length $Ln$ of 1.000″.

If the groove length $Lg$ is short, the depth D must be correspondingly small or shallow for the reason that the material will not flow freely through a deep narrow groove and proper deposition of the material on the inside wall of the barrel will not be attained. Moreover, the quantity of deposited material will be small and the process rate would, therefore, be adversely limited. If the groove length is made excessively long, the ability of screw section 33 to effect thorough mixing of the material would also be adversely limited. The above-stated preferred range of from 15% to 50% for groove length $Lg$ is recommended in processing most known plastics that are commonly subjected to extrusion, while the 10% to 100% range is applicable as regards all such materials.

The length to diameter ratio of devolatilizing screw section 33 is dependent on the particular material to be processed and on the desired degree of devolatization. In the case of a relatively long screw section 33, it is generally advantageous to provide at least one additional venting unit 23 in order to shorten the distance that evolved volatiles must travel before being removed from the barrel.

The pitch of flights F1 and F2 should be such that the material forwarding rate of screw section 33 is substantially greater than that at which the material enters this section, whereby screw section 33 is only partially filled with the material during operation. This insures continuous and adequate open paths along which the evolved volatiles are drawn into venting chamber 28.

Figure 7:
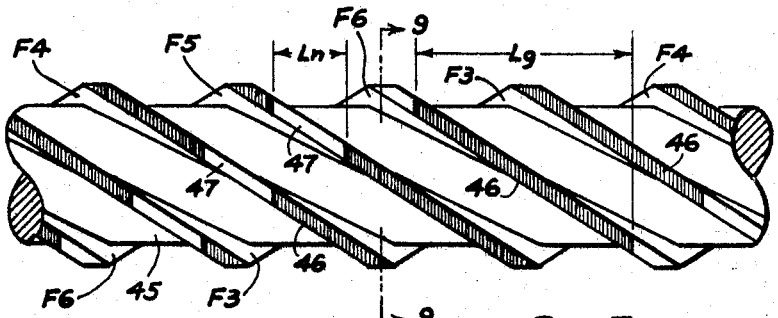
FIG. 7 corresponds to FIG. 3 and illustrates a second embodiment of an extruder screw devolatilizing and mixing section of this invention.
Figure 8:
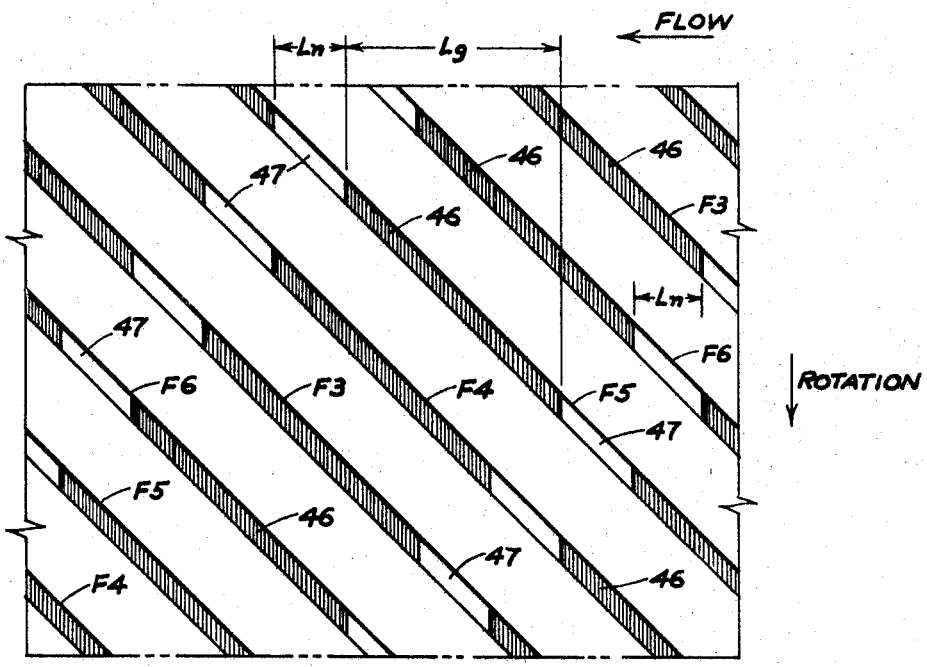
FIG. 8 is a development of the screw configuration shown in FIG. 7.
Figure 9:
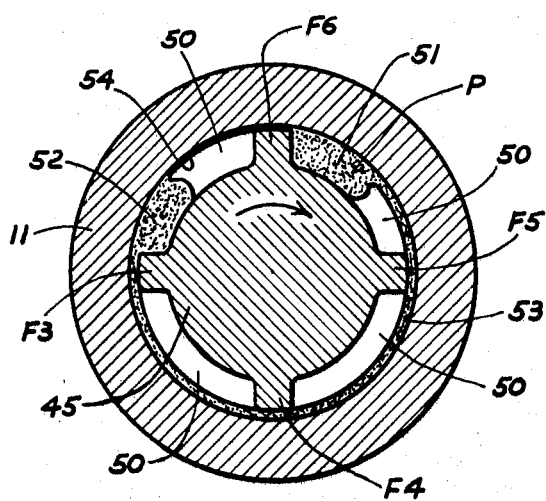
FIG. 9 is a view corresponding to FIG. 6 and illustrates the screw section of FIG. 7 in the barrel of FIG. 1, this view being taken along line 9—9 of FIG. 7.
Figure 10:
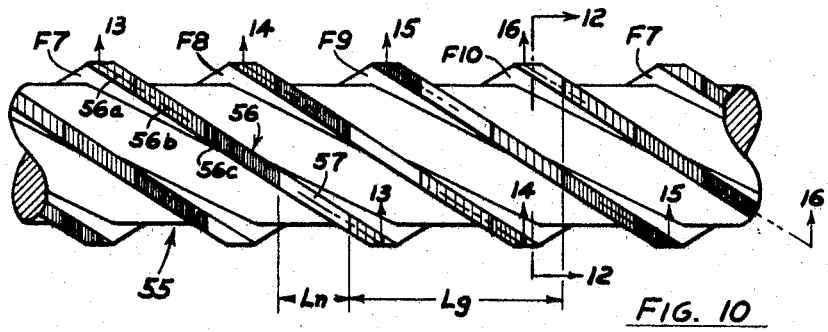
FIG. 10 also corresponds to FIG. 3 and illustrates a third embodiment of an extruder screw devolatilizing and mixing section of this invention.

Reference is now had to FIGS. 7, 8 and 9 which illustrate a second embodiment of a devolatilizing and mixing screw section 45 that may be utilized in lieu of above-described screw section 33 and that differs therefrom in two interdependent respects, namely in the number of flights and in the ratio of the length of each flight recess to that of each normal flight portion. As shown, screw section 45 is provided with four helical flights F3, F4, F5 and F6 which are identical and of the same hand and lead. Formed in and along each flight are equi-spaced shallow grooves 46 which appear as shaded areas in FIGS. 7 and 8. The normal portions of each flight are denoted by numeral 47. The grooves 46 and the normal portions 47 of each flight are arranged alternately, as best shown in FIG. 8. Each groove extends across the entire width of its flight and has a depth within the range of that of earlier described grooves 36. The length $Lg$ of each groove 46, as measured in a direction parallel to the axis of the screw, is equal to three times the length $Ln$ of each normal flight portion 47 measured in the same manner. The relative axis locations of the grooves 46 and normal portions 47 of the several flights is depicted in FIG. 8. As is shown in that view, the grooves 46 of flight F6 are offset from the grooves 46 in flight F3, in an axial direction toward the discharge end of the extruder, by a distance which is the same as length $Ln$ of each normal flight portion. The grooves in the other flights are offset a like distance from those of adjacent flights.

In FIG. 9, the spaces between successive pairs of flights are identified by numeral 50. Assuming that the screw is rotating in a clockwise direction, as indicated by the arrow in FIG. 9, the material P attains, at a selected instant during such rotation, the illustrated annular ring configuration, consisting of a portion 51 to the right of flight F6, a portion 52 above flight F3, a portion 53 extending between portions 51 and 52 and a portion 54 also extending between portions 51 and 52. Portions 51 and 52 fill parts of corresponding spaces 50. The thickness of portion 53 is determined by the depth of grooves 46 and the clearance between the flights and the barrel bore. Portion 54 is very thin and corresponds to the clearance between the flights and the bore as in the case of portion 44 (FIG. 6). The material is subjected to devolatilization and repeated mixing in the same manner described earlier herein with reference to the emobdiment of the invention shown in FIGS. 1 through 6.

It will be observed from an examination of FIGS. 9 and 6 that the embodiment of the invention of FIG. 9 provides approximtaely 90° more exposure of annular ring portion 53 to vacuum in its spaces 50 as compared to that of annular ring portion 43 of FIG. 6.

Reference is now had to FIGS. 10 through 16 which illustrate a third embodiment of a devolatilizing and mixing screw section 55 that may be used in place of either earlier-described screw section 33 or 45. As in the case of screw section 45, screw section 55 is provided with four helical flights F7, F8, F9 and F10 which are identical and of the same hand and lead. Formed in and along each flight are equi-spaced shallow grooves which are generally denoted by numeral 56. The normal portions of each flight are denoted by numeral 57. The arrangement of grooves 56 in each flight and their length relationship is the same as in FIGS. 7, 8 and 9. The third embodiment of the invention differs from the second embodiment in only one essential respect, to wit: in its grooves 56 as compared to grooves 46 of the second embodiment. Each groove 56 consists of three successively merging portions, namely portions 56a, 56b and 56c. Such portions are differentiated in FIGS. 10 and 11 by corresponding degrees of shading, portion 56a being represented by light shading, portion 56b by medium shading and portion 56c by dark shading. The length La, Lb and Lc of respective groove portions 56a, 56b and 56c, as measured in a direction parallel to the screw axis, are preferably equal to each other and to the length Ln of normal flight portion 57 measured in the same direction.

Figure 13:
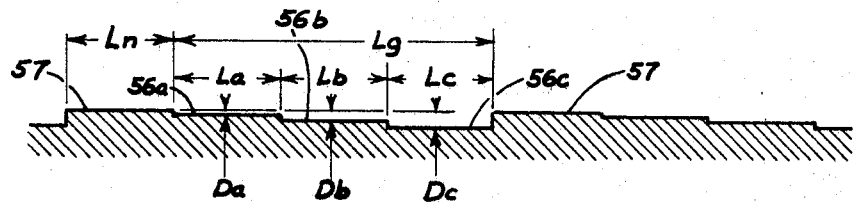
FIGS. 13 through 16 are partial sectional views of the flights of the screw section of FIG. 10 taken along lines 13—13, 14—14, 15—15 and 16—16, respectively, of FIG. 10.
Figure 14:
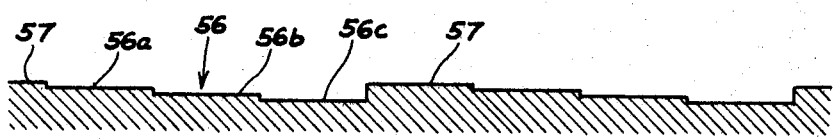
Figure 15:
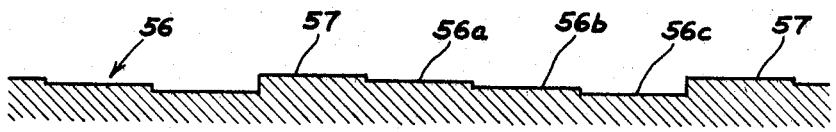
Figure 16:
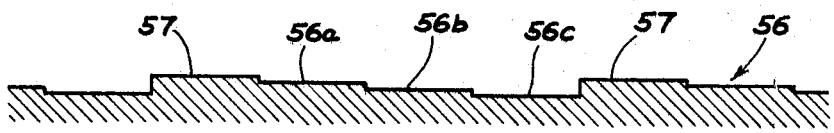

Recess portions 56a, 56b and 56c vary in depth as indicated by Da, Db and Dc, respectively, in FIG. 13.

Figure 11:
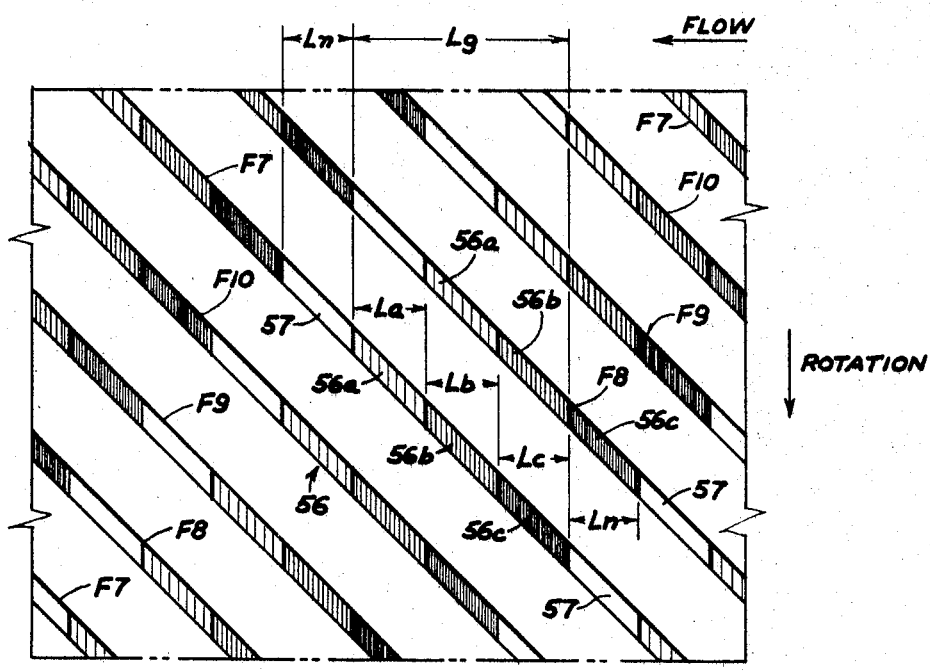
FIG. 11 is a development of the screw configuration shown in FIG. 10.

The relative axial locations of groove portions 56a, 56b and 56c and the normal flight portions 57 are best indicated in FIG. 11. As shown in this view, each groove portion 56c of flight F7 is offset from a groove portion 56c of flight F8, in an axial direction toward the discharge end of the extruder, by normal flight portion length Ln. The various groove portions in each flight are offset a like distance from corresponding groove portions in adjacent flights because, as stated earlier herein, the lengths La, Lb and Lc of the respective groove portions are equal to each other and to length Ln of normal flight portions 57.

Figure 12:
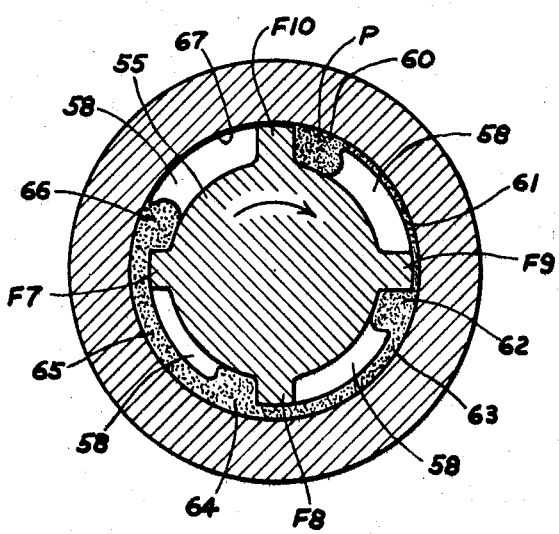
FIG. 12 is another view corresponding to FIG. 6 and illustrates the screw section of FIG. 10 in the barrel of FIG. 1, this view being taken along line 12—12 of FIG. 10.

In FIG. 12, which corresponds to FIGS. 6 and 9 of the earlier-described embodiments of the invention, the spaces between successive flights are identified by numeral 58. Assuming that the screw is rotated in a clockwise direction, is indicated by the arrow in FIG. 12, the material P attains, at a selected instant during such rotation, the annular ring configuration shown in this view. Starting at the right of flight F10 and proceeding clockwise, the annular ring consists of a successive portions 60 through 67. Portions 60, 62, 64 and 66 are immediately forward of the leading side surfaces of flights F10, F9 F8 and F7, respectively. Portion 61 extends between portions 60 and 62, portion 63 extends between portions 62 and 64, portion 65 extends between portions 64 and 66 and portion 67 extends between portions 66 and 60. Portions 61, 63 and 65 correspond in thickness to the respective depths Da, Db and Dc of groove portions 56a 56b and 56c. Portion 67 is very thin and, as in the case of portion 44 (FIG. 6) and portion 54 (FIG. 9), corresponds to the clearance between the flights and the bore.

The inner surface of the material of ring portion 65 is exposed to vacuum in its space 58 for somewhat less than a 90° increment of rotation of the screw at which time flight F8 having recess portion 56b will scrape off part of portion 65, thereby resulting in a material portion 63 of reduced thickness and, thus, exposing a new surface to the vacuum.

The scraped off bank of material 64 is moved toward the discharge end of the extruder by the forwarding action of flight F8 and mixes with the bank of material ahead of the next groove portion 56c of flight F8. In like manner, groove portion 56a of flight F9 will reduce the thickness of ring portion 63 and normal portion 57 of flight F10 will reduce the thickness of ring portion 61, banks of material 60 and 62 being simultaneously advanced toward the extruder discharge and mixed with other material.

It will be appreciated from an examination of FIG. 12 that the construction illustrated therein provides greater mixing ability than the constructions shown in FIGS. 6 and 9 since there are four banks of material, namely banks 60, 62, 64 and 66, being mixed in FIG. 12, as compared to only two banks, namely banks 41 and 42 in FIG. 6 and banks 51 and 52 in FIG. 9. Moreover, three surfaces of annular ring portions of suitable thickness are exposed in one revolution of the screw section of FIG. 12 as compared to only one such surface in each of FIGS. 6 and 9.

For best results, the depths of groove portions 56a, 56b and 56c of each groove 56 should be so proportioned that approximately equal amounts of the plastic material will be successively scraped off by the parts of the flights defining each groove portion. Accordingly and having reference to FIG. 13, it is preferred and recommended that Da equal one third of Dc and that Db equal two thirds of Dc.

Figure 17:
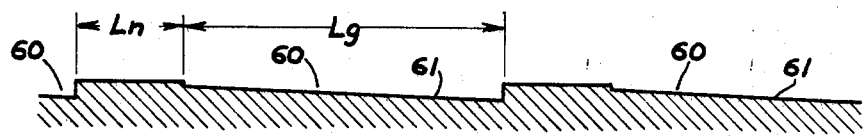
FIG. 17 is a view corresponding to FIG. 13 and illustrates a modified form of groove in the screw flighting.

FIG. 17 corresponds to FIG. 13 and illustrates another form of groove 60 which is a modification of the grooves 46 of the embodiment of the invention shown in FIGS. 7, 8 and 9 and the grooves 56 of the embodiment of the invention shown in FIGS. 10 through 16. Grooves 60 differ over grooves 46 and 56 in that the peripheral portions 61 of the flights which define the bottoms of these grooves are portions of the surface of a right circular cone. Grooves 60 are otherwise the same as grooves 46 and 56. It will be evident that grooves having the configuration of grooves 60 may be utilized effectively in place of grooves 36 of the embodiment of the invention shown in FIGS. 1 through 6.

The overall lengths and depths of the several grooves 36, 46, 56 and 60 are all within the corresponding ranges set forth earlier herein.

The embodiment of the invention shown in FIGS. 1 through 6 contemplates a devolatilizing and mixing screw section 33 having a pair of flights while the embodiments shown in FIGS. 7, 8 and 9 and in FIGS. 10 through 16 contemplate respective devolatilizing and mixing screw sections 45 and 55 having four flights. It is also within the purview of this invention to provide such a devolatilizing and mixing screw section with three flights or more than four flights. In other words, the screw section must be provided with at least two flights. Also the length Lg of each groove should equal the length Ln of each normal flight portion times the number of flights minus one. In the case of constructions wherein the flight grooves have portions of different depth, such as in the embodiment of the invention shown in FIGS. 10 through 16, the number of such portions per groove should preferably equal the number of flights minus one.

From the foregoing, it is believed that the objects, advantages, construction and operation of the present invention will be readily comprehended by persons skilled in the art, without further description. Although the invention has been herein shown and described in several practicable forms, it is recognized that certain parts or elements

We claim:

1. In a plastics extrusion machine which includes a barrel having a cylindrical bore, a rotary screw unit within the bore for advancing plastic material therealong and a venting unit communicating with a selected portion of the bore and adapted to effect withdrawal of volatiles evolved from the plastic material in said selected portion of the bore, the improvement comprising:
   (a) a devolatizing and mixing screw section within said selected portion of the bore, said screw section being coaxial and rotatable with the screw unit and including:
      (1) a plurality of helical flights of the same hand and lead, each flight being formed with a plurality of normal flight portions and a plurality of grooves, each groove extending across its flight and inwardly from the peripheral surfaces of corresponding normal flight portions, the grooves and the normal flight portions being arranged alternately, the length of each groove, as measured in a direction parallel to the axis of the screw section, being within the range of from 10% to 100% of the outside diameter of the screw section times the number of flights minus one.

2. In a plastics extrusion machine which includes a barrel having a cylindrical bore, a rotary screw unit within the bore for advancing plastic material therealong and a venting unit communicating with a selected portion of the bore and adapted to effect withdrawal of volatiles evolved from the plastic material in said selected portion of the bore, the improvement comprising:
   (a) a devolatizing and mixing screw section within said selected portion of the bore, said screw section being coaxial and rotatable with the screw unit and including:
      (1) a plurality of helical flights of the same hand and lead, each flight being formed with a plurality of normal flight portions and a plurality of grooves, each groove extending across its flight and inwardly from the peripheral surfaces of corresponding normal flight portions, the grooves and the normal flight portions being arranged alternately, the depth of each groove being within the range of from 0.3% to 10.0% of the outside diameter of the screw section, as measured over the normal flight portions.

3. A machine according to claim 2 wherein the length of each groove, as measured in a direction parallel to the axis of the screw section, is within the range of from 10% to 100% of the outside diameter of the screw section times the number of flights minus one.

4. A machine according to claim 3 wherein said length of each groove, as measured in a direction parallel to the axis of the screw section, is within the range of from 15% to 50% of the outside diameter of the screw section times the number of flights minus one.

5. A machine according to claim 3 wherein the length of each normal flight portion, as measured in a direction parallel to the axis of the screw section, is substantially equal to the length of each groove divided by the number of flights minus one.

6. A machine according to claim 3 wherein each normal flight portion of any selected flight is spaced about the axis of the screw section from a grooove of each of the other flights.

7. A machine according to claim 3 wherein each groove of each flight is opposite a normal flight portion of the next adjacent flight.

8. A machine according to claim 3 wherein the peripheral surface of each flight which defines the bottom face of a groove is a portion of the surface of a right circular cylinder.

9. A machine according to claim 3 wherein the peripheral surface of each flight which defines the bottom face of a groove is a portion of the surface of a right circular cone.

10. A machine according to claim 1 wherein each groove consists of a plurality of successive groove portions of different depth, the depths of the groove portions increasing successively in the direction of the upstream end of the screw section.

11. A machine according to claim 10 wherein the depth of the shallowest and of the deepest of such groove portions are respectively not less than 0.3% and not greater than 10.0% of the outside diameter of the screw section, as measured over the normal flight portions.

12. A machine according to claim 11 wherein successive groove portions of each groove differ in depth by substantially the same increment.

13. A machine according to claim 11 wherein the number of groove portions of each groove is equal to the number of flights minus one.

14. A machine according to claim 13 wherein the length of each normal flight portion, as measured in a direction parallel to the axis of the screw section, is substantially equal to the length of each groove divided by the number of flights minus one.

15. A machine according to claim 14 wherein the length of each groove portion is substantially equal to the length of each normal flight portion.

16. A machine according to claim 15 wherein each groove portion of a selected flight is offset from a corresponding groove portion of a next adjacent flight, in an axial direction toward the discharge end of the barrel, by a distance substantially equal to the length of a normal flight portion.

17. A machine according to claim 16 wherein the peripheral surface of each flight which defines the bottom face of each groove portion is a portion of the surface of a corresponding right circular cylinder.

18. A machine according to claim 16 wherein the peripheral surface of each flight which defines the bottom face of each groove portion is a portion of the surface of a corresponding right circular cone.

References Cited

UNITED STATES PATENTS

| | | |
|---|---|---|
| 2,813,302 | 11/1957 | Beck. |
| 2,896,253 | 7/1959 | Mol. |
| 3,211,209 | 10/1965 | Latinen et al. |
| 3,411,179 | 11/1968 | Gregory et al. |
| 3,461,497 | 8/1969 | Geyer. |

WILLIAM J. STEPHENSON, Primary Examiner